May 4, 1965

K. G. KREUTER 3,181,548

CONDITION RESPONSIVE PNEUMATIC CONTROLLER

Filed Feb. 27, 1962

INVENTOR
Kenneth G. Kreuter

BY *Herbert M Birch*

ATTORNEY

May 4, 1965  K. G. KREUTER  3,181,548
CONDITION RESPONSIVE PNEUMATIC CONTROLLER
Filed Feb. 27, 1962  5 Sheets-Sheet 2

INVENTOR
Kenneth G. Kreuter

BY
ATTORNEY

May 4, 1965  K. G. KREUTER  3,181,548
CONDITION RESPONSIVE PNEUMATIC CONTROLLER
Filed Feb. 27, 1962  5 Sheets-Sheet 3

FIG. 5.

INVENTOR
Kenneth G. Kreuter

BY *Herbert M. Birch*

ATTORNEY

May 4, 1965 K. G. KREUTER 3,181,548
CONDITION RESPONSIVE PNEUMATIC CONTROLLER
Filed Feb. 27, 1962 5 Sheets-Sheet 4

FIG.6.

INVENTOR
Kenneth G. Kreuter

BY *Herbert M Birch*

ATTORNEY

FIG. 7.

INVENTOR
Kenneth G. Kreuter

United States Patent Office 3,181,548
Patented May 4, 1965

3,181,548
CONDITION RESPONSIVE PNEUMATIC CONTROLLER
Kenneth G. Kreuter, Goshen, Ind., assignor to Robertshaw Controls Company, a corporation of Delaware
Filed Feb. 27, 1962, Ser. No. 175,979
14 Claims. (Cl. 137—85)

The present invention relates to a pneumatic controller for sensing conditions, such as temperature or pressure and modulating a pneumatic output pressure accordingly.

An object of this invention is to provide means for modulating the pneumatic output of the controller according to the resultant action of a suitable single pneumatic condition sensing means in accordance with a desired measured value of temperature or pressure which measured value is generally termed the "set point."

Another object is to provide a novel changeover lever arrangement for air temperature control systems, adapted to control either the heating cycle or the cooling cycle for conditioning the air in an enclosure, whereby changeover is accomplished by a single lever upon minor adjustment thereof to change the controller from direct action for the heating cycle to reverse action for the cooling cycle. That is, with increasing temperature on a suitable sensing element, such as a remote bulb temperature controller or the like the output pressure of the pneumatic controller can be made to either increase or descrease proportionally.

Prior art controls and linkage changeover mechanisms have required more elaborate and complex linkage mechanisms to reverse the action of the controller.

Another object is to provide in a pneumatic control, a throttling range dial adapted to be set for any desired sensitivity either modulating or two position, whereby as a modulating control, the output pressure changes gradually with temperature, and as a two position control, the output is either equal to the supply pressure or zero with a differential as indicated on the dial.

With the above and other objects and advantages of the invention in view, the invention is best understood by reference to the following drawings, wherein a complete embodiment of the invention is illustrated.

Figure 6:
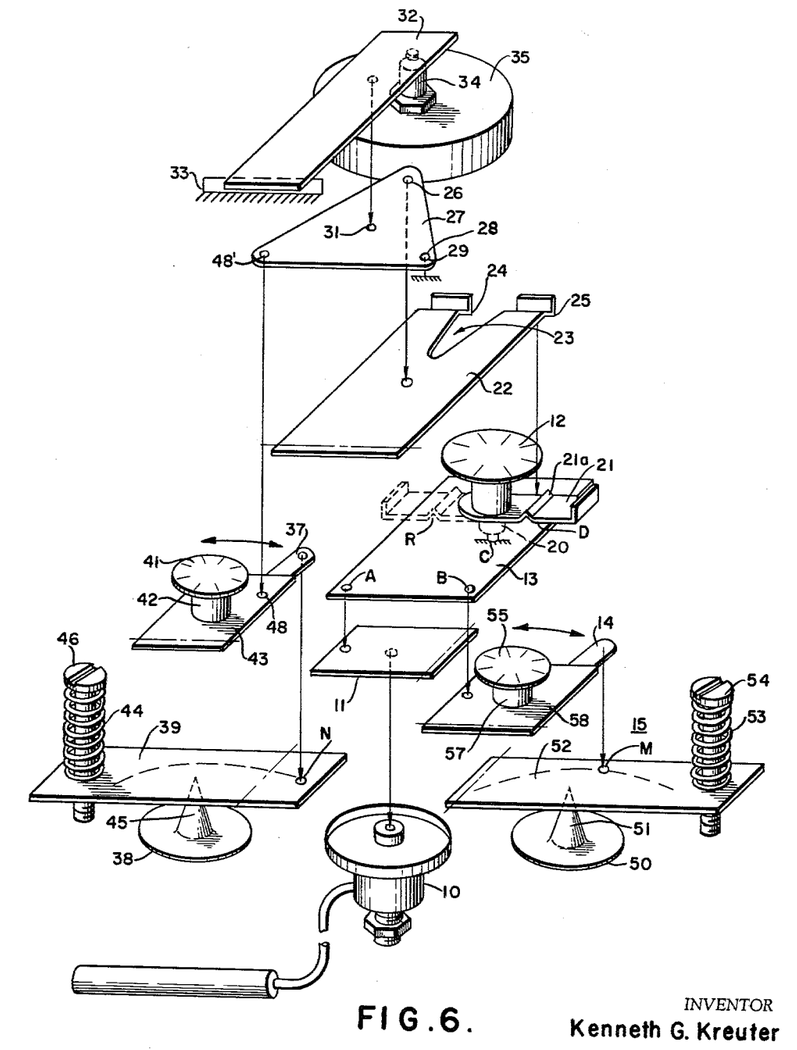
FIGURE 6 is a diagrammatic view of the elements of the pneumatic control unit pulled apart and juxtapositioned in their respective operative positions.

First with particular reference to FIGURE 6 of the drawings, the objects of this invention are attained by providing a temperature or pressure sensing element 10 operatively associated with an input lever 11, a manually controlled value measuring means, such as a set-point dial 12 operatively connected to a set-point lever 13 having a plurality of lever connecting points A, B and C for pivotal connection at point A to the input lever 11 and with a lever 14 of a sub-master control means 15 at point B. The set-point dial 12 connects to set-point lever 13 at point C by a dial screw 20.

Mounted on the set-point dial screw 20 for pivotal swinging movement is a changeover lever 21, which is movable from a position marked R at a corner of set-point lever 13, see the dotted line position thereof in FIGURE 6, to a position marked D at the transversely opposite corner of the set-point lever 13.

Superimposed above the changeover lever 21 on the dial screw 20 is a reverse acting and direct acting cooperating lever 22 having a bifurcated portion 23 formed with transversely spaced knife edge cams 24 and 25. These cams are selectively engaged by a similar opposed upstanding cam 21a formed intermediate the end of the changeover lever 21, see FIGURES 3, 4 and 6.

Figure 1:
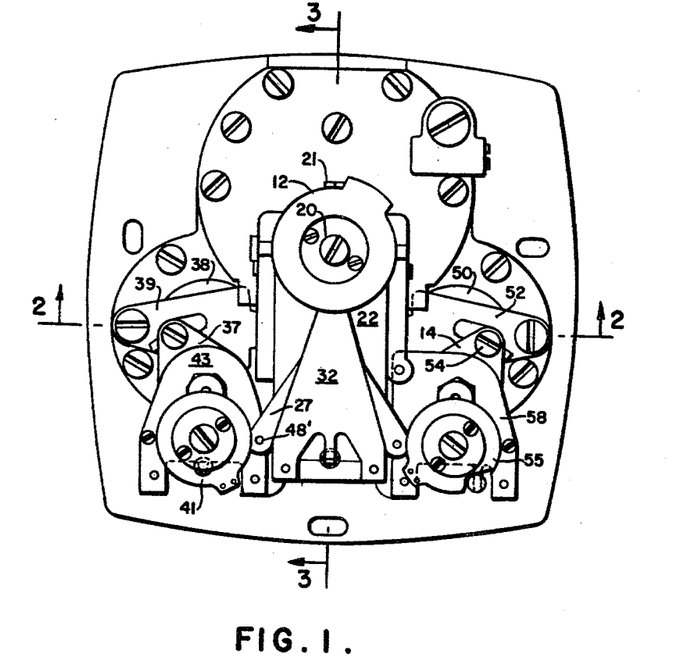
FIGURE 1 is a top plan view of the present pneumatically operated control with the cover removed.
Figure 2:
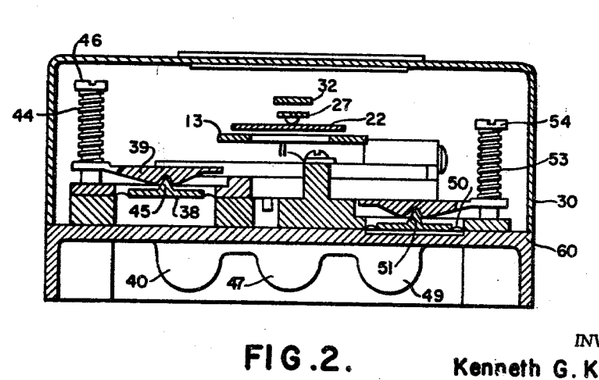
FIGURE 2 is a cross section view of FIGURE 1 taken on line 2—2, but with the unit cover applied.
Figure 3:
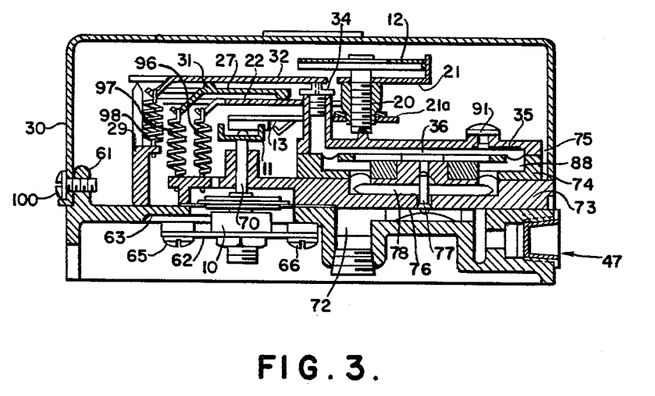
FIGURE 3 is a cross section view taken on line 3—3 of FIGURE 1.
Figures 3A, 4:
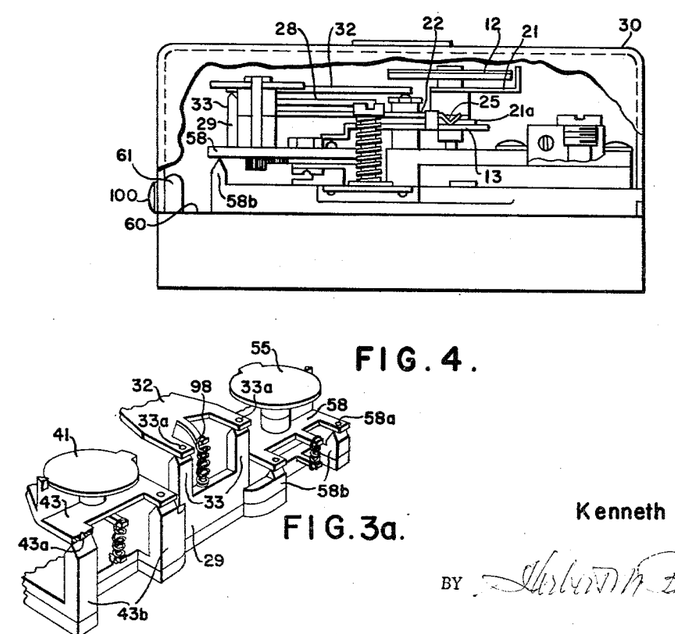
FIGURE 3a is a rear perspective view of the control unit showing a detail of some of the hinge means for the lever means thereof.
FIGURE 4 is an end view in elevation of FIGURE 3 with a portion of the unit cover broken away.
Figure 5:
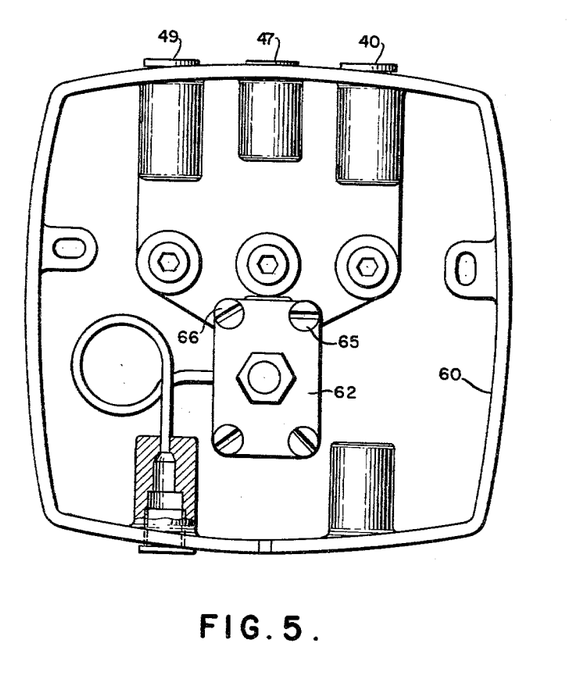
FIGURE 5 is a bottom plan view of the control unit showing the various conduit connection locations.

As a result of the movement of changeover lever 21 and its selective cam-to-cam engagement with the cooperating lever 22, motion is imparted to a raised bearing point 26 of a triangular output lever 27, which output lever rests on a stationary pivot 28 on a suitable supporting frame 29 enclosed in the controller unit cover 30, see FIGURES 3 and 4. A centrally positioned bearing lug 31 is provided on said output lever and is in contact with a medial under portion of a leakport flapper 32, whereby movement of said output lever about a pivot 28 may cause displacement of the flapper 32.

This lever or flapper 32 is pivotally connected by a spring biased hinge pivot at one end to upright means 33, see FIGURE 3a, from the instrument frame means 29 and the resultant pivotal movement thereof selectively impedes the flow of fluid from the leak port nozzle 34 of a pneumatic relay 35, see FIGURES 3, 4 and 6.

Such impedance to the flow at the leak port nozzle 34 controls the pressure in the relay pilot chamber, see FIGURES 3 and 7, as hereinafter explained. As a result pressure in the feedback line to a feedback diaphragm 38 is varied in proportion to the flapper position and also the pressure in the output or branch line 40 changes accordingly, see FIGURES 6 and 7. Further control of desired sensitivity may be provided by the setting of the throttling range dial 41 rotatably mounted on a dial screw 42 upstanding from a fixed plate 43 and below which the feedback lever 37 is movable to right or left in contact with the flexure hinged diaphragm plate 39.

The setting of the dial 41 causes movement of the feedback lever 37 between hinged plate 43 and the feedback diaphragm plate 39, which movement may be either to the right or left of a neutral position for a pick up point N, as desired. As the lever 37 is moved over the feedback diaphragm plate 39, said plate 39 is moved by thrust button 45 against the biasing action of an adjustable range spring 44 on a screw 46, to thereby control the feedback according to the setting of the throttling range dial 41.

For example, movement of the lever 37 to the right provides a positive feedback for two-position control, that is on-off operation, with the output pressure of line 40 either equal to the supply pressure which is supplied at 47 or zero with a differential as indicated on the throttling range dial 41 and movement to the left provides negative feedback for modulating control, whereby the output pressure changes gradually with pressure or temperature.

The feedback assembly is coupled from an intermediate bearing point 48 on the throttling range lever 43 of the said feedback assembly to a cooperating bearing point 48' comprising the third apex or corner of the triangular output lever 27.

Figure 7:
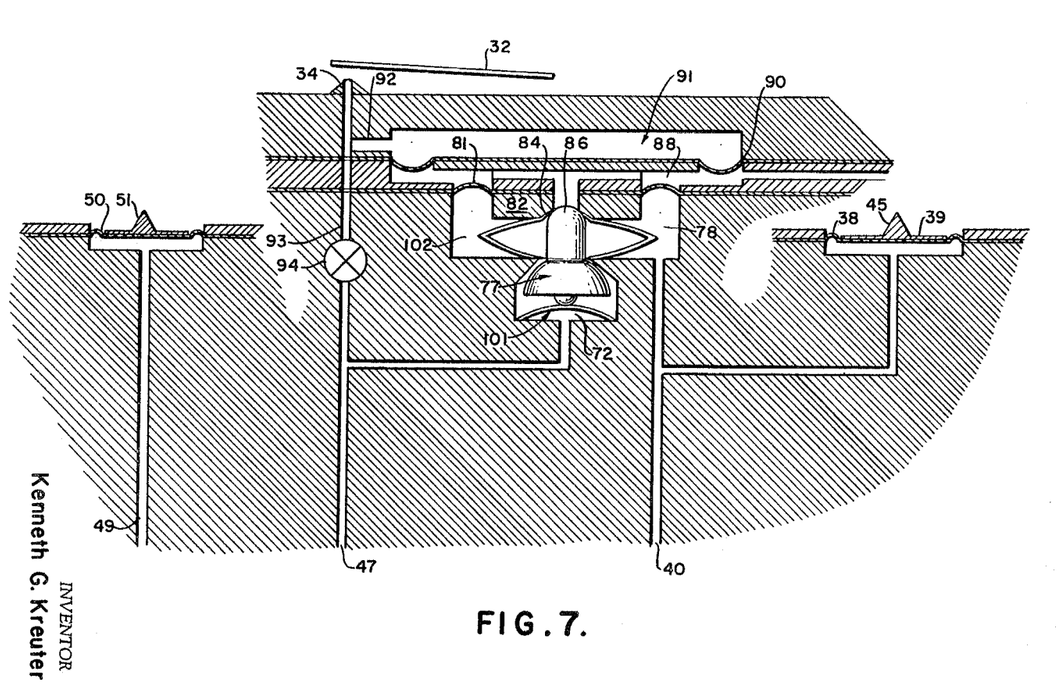
FIGURE 7 is an enlarged diagrammatic view of the pneumatic relay means and the source of supply and output connections thereof.

Still with reference to FIGURES 6 and 7, the sub-master assembly 15 of the control includes a sub-master diaphragm 50 with a thrust button 51 in engagement with an elongated flexure hinged plate 52. The plate 52 and diaphragm movement are opposed by an adjustable range spring 53 coiled on a screw 54 threaded into the plate adjacent one end thereof. A submaster range control dial 55 rotatable on a dial screw 57 is supported by a hinged support plate 58 positioned by pins 58a so as to pivot on the knife edges at the top of uprights 58b, see FIGURE 3a. The sub-master set-point lever 14 is pivotally mounted on the dial screw 57.

The transmission of sub-master lever movement to bearing point B of the set-point lever 13 is regulated by positioning the pickup point M from a neutral position on hinged plate 52 back and forth as plate 52 is moved, thus proportionally picking up more or less of the movement supplied by the sub-master diaphragm. With the pickup point M exactly on the line of pivot of the sub-master diaphragm lever 14 at neutral position, no movement is imparted to the set-point lever 13 at point B thereof.

Thus the sub-master assembly may or may not be combined into the control operation.

The foregoing elements are all mounted on a suitable flanged supporting base 60, with several threaded apertured lugs 61 at the peripheral edge thereof, see FIGURES 3 and 4. For example, the sensing element 10 is supported by a plate 62 and is suitably secured in an offset countersunk portion 63 to the flanged side of the base 60 by screws 65 and 66 to the base. The element 10 includes an operating pin 70 engageable with the hinged control input lever 11.

Offset from the sensing element mounting on the under side of the base plate 60 is the pneumatic relay 35. This relay is formed with a main air supply chamber 72, which is formed on the opposite or upper side of the base 60, see FIGURES 3 and 7. The air supply chamber provides the lower portion of the pneumatic relay 35. This relay is comprised of three stacked spaced apart plates 73, 74 and 75 with diaphragm means secured therebetween. These diaphragms are arranged to provide the lower main air supply chamber 72, the main valve seat 76 and main valve 77 opening to the vertically aligned branch chamber 78 connecting with the branch line 40 and feedback diaphragm 38, the exhaust chamber 79 with the branch chamber and exhaust chamber dividing wall formed by a diaphragm 81 carrying a valve disc 82 formed with a central valve seat 84 carried by the diaphragm, and the upper pilot chamber 91 to the leak port 34, see FIGURES 3 and 7. The disc valve seat 84 coacts with the upper valve head 86 of the main valve 77 to open into the exhaust chamber 88. The upper wall of the exhaust chamber comprises a diaphragm 90 and serves as the bottom wall of the relay pilot chamber 91, which connects at duct 92 to leakport nozzle 34.

The leakport nozzle 34 includes a conduit 93 from a suitable restrictor means, such as a needle valve 94, see FIGURE 7, and the main air supply line 47 connects to the needle valve and also to the main air supply chamber 72.

Each of the levers 22, 27 and 32 are similarly pivoted on suitable spaced upright means from the base of the instrument, such as uprights 33 on the base 60 and are biased into their respective normal positions by their coil springs 96, 97 and 98, see FIGURE 3. The uprights 33, for example, for lever 32 as shown in FIGURE 3a include position or locating pins 33a to retain the lever arms of lever 32 upon the top knife edges of the respective uprights 33. Thus flapper 32 is normally biased to close the leakport nozzle 34 and the flapper lever 32 movement is set by the set-point lever and the position of the associated lever systems, whereby the position thereof will through the relay 35 control the output or branch pressure to operate a suitable pneumatic valve, not shown, in the heating or cooling system. The levers of the lever system operate to correspond to the set-point value for either modulating when the feedback means is in the system or two-position control as selected when the feedback means is set at neutral.

The entire lever mechanism and relay means are enclosed by the cover 30, which is secured to the lugs 61 by suitable screw means 100, see FIGURES 3 and 4.

The relay 35 is supplied with compressed air from main line 47 into the main air supply chamber 72 and the main air supply also passes through the restriction provided by the needle valve 94 and to the nozzle 34. The pivoted flapper 32 controls the air pressure in the nozzle conduit and the relay pilot chamber 91. The pressure in the pilot chamber 91 acts upon the diaphragm 90 of the relay 35, and thereby regulates the exhaust from chamber 88 and the position of the disc valve 82 with respect to the main valve 77, whereby output pressure to branch line 40 and the feedback line to feedback diaphragm 38 is varied according to the set-point value of the lever system.

The remote control or sub-master control unit is controlled through a separate pressure line 49 from a suitable sensing device, not shown, to its diaphragm.

The main relay valve is normally spring biased by a spring 101 to closed position and is movable in a bellows type diaphragm 102 confined in the branch or output chamber 78, which expands and contracts according to main line pressure, whereby these pressures may be balanced so the control is highly sensitive to very small motions and adjustments of the several inter-connected lever means hereinbefore described. Such lever means are the main features of this invention and the operation of the novel control lever means is accordingly described in detail as follows:

*Operation*

Briefly reviewing the operation of the present novel remote bulb temperature controller and pressure controller with reference in particular to FIGURE 6, the sensing element 10 pushes up on the input lever 11. The resulting movement of the lever is multiplied, for example, approximately 4:1 and is fed into one corner of the rectangular set-point lever 13.

The set-point lever is resting on three triangularly arranged points A, B and C, on the input lever 11 at corner point A, on the sub-master lever 58 at corner point B, and the end of the set-point dial screw 20 at point C.

The two free corners or remaining corners of lever 13 are for illustration, referenced R and D, respectively, and are transversely opposite each other on each side of the point C midway therebetween. The corner D is for alignment reference with the changeover lever 21 for direct action of the pneumatic control while the corner R is for alignment reference with the changeover lever when shifted for reverse action of the pneumatic control and vice versa.

The resultant movement of changeover lever 21 from point D or point R is imparted to direct or reverse acting lever 22 and is transmitted to the triangular output lever 27 at point 26 thereof, said lever having a fixed pivot point 28 to frame means 29 and a third point resting on the feedback lever 43. The resultant movement of the output lever 27 is imparted from its centrally positioned lug 31 to the leakport lever or flapper 32.

Any such imparted movement of the flapper 32 opens or closes the leakport of nozzle 34, which for example operates a 2:1 ratio relay, such as generally is referenced 35, see FIGURES 3 and 7. This leakport control action determines the branch output pressure in line 40.

The set-point lever 13 at point B rests upon the sub-master or remote control lever 58 and the movement of the submaster lever and assembly is regulated by moving the pickup point M of the assembly back and forth through lever 14. This movement or displacement of the pickup point M by the swinging action of lever 14 thus picks up more or less of the movement supplied by the sub-master diaphragm 50 connected to pressure sensing line 49. The movement of the diaphragm 50 is opposed by the range spring 53 by means of an adjusting screw 54. When the pickup point M is positioned exactly on the line of pivot of the sub-master diaphragm lever 52, no movement is imparted to the set point lever 13 and the same is inactive.

Now considering the feedback assembly, the feedback movement transmitted to the throttling range plate 43 from feedback diaphragm 38 is regulated by the position of the pickup point N at the feedback diaphragm plate 39, as the feedback lever 37 is moved back and forth. This movement provides for proportionally picking up more or less of the movement supplied by the feedback diaphragm 38.

The range of movement of the diaphragm is adjustable according to the setting of the range spring 44, which is coiled onto the headed adjusting screw 46 threaded into an end of the diaphragm plate 39. The throttling range dial 41 and the feedback lever 37 are movable to position the pickup point N, so that when this point is exactly on the line of pivot of the feedback diaphragm, the lever is in a neutral position and no feedback movement is imparted to the output lever 27. Thus movement to the right of the said neutral position of the point N provides positive feedback for two-position operation, while movement to the left of the neutral position of point N provides negative feedback for modulating operation.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. In a pneumatic control apparatus comprising a casing for housing in a compact assembly adaptable for either modulating or two position control as selected, means for establishing an output pressure variable in response to a condition being measured for the purpose of controlling said condition, said means comprising a superimposed lever system of plates, one of said plates being an input plate, a triangular output plate pivoted at the apex of one corner thereof to a supporting base and a plurality of intermediate plates, operatively associated between said input and output plates, said triangular output plate at a second corner at the apex thereof having a bearing point engageable with a next adjacent intermediate plate, a third corner at the apex thereof having a bearing point engaging a throttling range lever, a condition responsive means operatively engaged with the input lever plate of said system, one of said intermediate plate levers being a set point lever, operatively connected means to said set point lever for setting the value at which said output pressure is to be established, said set point lever plate being engageable with said input lever plate for movement thereby, a pilot valve positioned in said casing above said triangular output lever plate and having a control means, said control means being engaged with a fourth bearing point of said triangular output lever plate in accordance with the forces applied by said condition responsive means to said input lever plate and operatively associated intermediate plates, and a pneumatic relay having a main fluid supply line and a fluid output line, the output of said output line being proportional to the positioning of said pilot valve control means by said triangular output lever.

2. In a pneumatic control apparatus comprising a casing for housing in a compact assembly adaptable for either modulating or two position control as selected, means for establishing an output pressure variable in response to a condition being measured for the purpose of controlling said condition, said means comprising a superimposed lever system of plates, one of said plates being an input plate, a triangular output plate pivoted at the apex of one corner thereof to a supporting base and a plurality of intermediate plates, operatively associated between said input and output plates, said triangular output plate at a second corner at the apex thereof having a bearing point engageable with a next adjacent intermediate plate, a third corner at the apex thereof having a bearing point engaging a throttling range lever, a condition responsive means operatively engaged with the input lever plate of said system, one of said intermediate plate levers being a set point lever, operatively connected means to said set point lever for setting the value at which said output pressure is to be established, said set point lever plate being engageable with said input lever plate for movement thereby, a pilot valve positioned in said casing above said triangular output lever plate and having a control means, said control means being engaged with a fourth bearing point of said triangular output lever plate in accordance with the forces applied by said condition responsive means to said input lever plate and operatively associated intermediate plates, and a pneumatic relay having a main fluid supply line and a fluid output line, the output of said output line being proportional to the positioning of said pilot valve control means by said triangular output lever, said intermediate output pressure value setting plates being controlled by said operatively connected set point control means, said set point control means comprising a set point indicator dial, and a shaft rotatably supporting said dial for adjustment of said dial to establish set point values of output pressure.

3. In a pneumatic control apparatus comprising a casing for housing in a compact assembly adaptable for either modulating or two position control as selected, means for establishing an output pressure variable in response to a condition being measured for the purpose of controlling said condition, said means comprising a superimposed lever system having an input lever, an output lever and a plurality of intermediate levers operatively associated between said input and output levers, a condition responsive means operatively engaged with the input lever of said system, one of said intermediate levers being a set point lever, operatively connected means to said set point lever for setting the value at which said ouput pressure is to be established, said set point lever being engageable with said input lever for movement thereby, a pilot valve positioned in said casing above said output lever and having a control means, said control means being movable by said output lever in accordance with the forces applied by said condition responsive means to said input lever and operatively associated intermediate levers, and a pneumatic relay having a main fluid supply line and a fluid output line, the output of said output line being proportional to the positioning of said pilot valve control means by said output lever, said intermediate output pressure value setting levers being controlled by said operatively connected set point control means, said set point control means comprising a set point indicator dial, a shaft rotatably supporting said dial for adjustment of said dial to establish set point values of output pressure, a reverse acting or direct acting lever pivotally mounted above said set point lever, and elongated changeover lever pivotally mounted at one end on said dial set point shaft, said changeover lever and said reverse acting and direct acting lever each having coacting cam means on opposed alignable surfaces thereof, whereby aligned contact of the cam means of said changeover lever with the cam means of said reverse acting and direct acting lever serves to change the operation of said control apparatus levers from reverse action to direct action of said pilot valve control means or vice versa, said last-named lever having an output bearing point engageable with a predetermined portion of said output lever.

4. In a pneumatic control apparatus comprising a casing for housing in a compact assembly adaptable for either modulating or two position control as selected, means for establishing an output pressure variable in response to a condition being measured for the purpose of controlling said condition, said means comprising a superimposed lever system having an input lever, an output lever and a plurality of intermediate levers operatively associated between said input and output levers, a condition responsive means operatively engaged with the input lever of said system, one of said intermediate levers being a set point lever, operatively connected means to said set point lever for setting the value at which said output pressure is to be established, said point lever being engageable with said input lever for movement thereby, a pilot valve positioned in said casing above said output lever and having a control means, said control means being movable by said ouput lever in accordance with the forces applied by said condition responsive means to said input lever and operatively associated intermediate levers, and a pneumatic relay having a main fluid supply line and a fluid output line, the output of said output line being proportional to the positioning of said pilot valve control means by said output lever; and wherein said output lever is triangular and is pivoted at the apex of one corner thereof to a supporting base and is formed on an adjacent corner thereof with a bearing point on the lower side engageable with a next adjacent intermediate lever, and said output lever is formed with a bearing point intermediate the apices thereof on the upper side engageable with the intermediate lower side of said output lever to said pilot valve control means.

5. In an air conditioning system, a pneumatic control unit for controlling pneumatic output operating pressure having a condition sensing element, said control comprising a leak port and a flapper valve therefor, a linkage motion transmitting system actuated by said element, said linkage system having an input lever movable by said condition sensing element, said linkage system having an output lever connecting with said flapper valve for controlling the position of said flapper valve proportional to a sensed condition of said element, a single lever in said linkage system adapted to shift said linkage from actuation of said flapper valve in one direction to an actuation thereof in a reverse direction, a pneumatic relay means, said leak port being connected to said relay means, a source of motive fluid supply from a supply line connected to said relay means and an output pressure branch line connected to said supply line, said branch line being connected to suitable control valve means or the like in the said air conditioning system, said single lever being mounted on a bushing rotatable on a concentrically positioned control shaft of a set point control means, said set point means including a set point dial turnable with said bushing on said shaft, and a rectangular lever formed on its lower side with a bearing point engageable with the upper side of the input lever of said linkage system, and said set point lever being movable in proportion to said condition sensing means according to the set point of said set point dial and the position of said changeover lever for either direct or reverse action of said flapper valve.

6. In an air conditioning system, a pneumatic control unit for controlling pneumatic output operating pressure having a condition sensing element, said control comprising a leak port and a flapper valve therefor, a linkage motion transmitting system actuated by said element, said linkage system having an input lever movable by said condition sensing element, said linkage system having an output lever connecting with said flapper valve for controlling the position of said flapper valve proportional to a sensed condition of said element, a single lever in said linkage system adapted to shift said linkage from actuation of said flapper valve in one direction to an actuation thereof in a reverse direction, a pneumatic relay means, said leak port being connected to said relay means, a source of motive fluid supply from a supply line connected to said relay means and an output pressure branch line connected to said supply line, said branch line being connected to suitable control valve means or the like in the said air conditioning system, said single lever being mounted on a bushing rotatable on a concentrically positioned control shaft of set point control means, said set point means including a set point dial turnable with said bushing in said shaft, and a rectangular lever formed on its lower side with a bearing point engageable with the upper side of the input lever of said linkage system, and said set point lever being movable in proportion to said condition sensing means according to the set point of said set point dial and the position of said changeover lever for either direct or reverse action of said flapper valve, and a sub-master control means having an output lever formed with a take-off bearing point adjacent an edge thereof on the upper side thereof, said take-off bearing point engaging the lower side of an adjacent corner of said rectangular set point lever, said sub-master control including pressure responsive means and a control dial for regulating the said pressure responsive means and the output of said sub-master control to said set point lever.

7. In a pneumatic control apparatus comprising a casing for housing in a compact assembly means adaptable for either modulating or two position control as selected, means for establishing an output pressure variable in response to a condition being measured for the purpose of controlling said condition, said means comprising a superimposed lever system having an input lever, an output lever and a plurality of intermediate levers operatively associated with said input and output levers, a condition responsive means operatively engaged with the input lever of said system, one of said intermediate levers being a set point lever, operatively connected means to said set point lever for setting the value at which said output pressure is to be established, said set point lever being engageable with said input lever for movement thereby, a pilot valve positioned in said casing above said output lever and having a control means, said control means being movable by said output lever in accordance with the forces applied by said condition responsive means to said input lever and operatively associated intermediate levers, a pneumatic relay having a main fluid supply line and a fluid output line, the output of said output line being proportional to the positioning of said pilot valve control means by said output lever, feedback means responsive to the output pressure in said output line comprising an adjustable linkage operatively associated with said intermediate levers and said output lever for modulating the action of said output lever on said pilot valve control means, and a throttle control means in said feedback linkage for variably adjusting the operating range of said feedback means, to thereby control the response of said intermediate levers of the system to the initial setting of said set point lever, whereby said desired output pressure is established.

8. In a pneumatic control apparatus comprising a casing for housing in a compact assembly means adaptable for either modulating or two position control or for remote control of said assembly means as selected, means for establishing output pressure variable in response to a condition being measured for the purpose of controlling said condition, said means comprising a superimposed linkage system having an input lever, an output lever and a plurality of intermediate levers so positioned and so arranged as to proportionally transmit movement imparted to the input lever of the linkage system to the output lever of the linkage system, a pilot valve having a flapper and a nozzle, said output lever engaging the lower side of said flapper to move the same to or from the nozzle, said intermediate levers including a set point lever and a bifurcated reverse and direct acting lever, a set point lever adjusting means, a manually swingable changeover lever mounted between said intermediate levers, said respective bifurcated ends of said reverse and direct acting lever having cam surfaces on the respective lower side surfaces thereof, said changeover lever having a cooperating cam surface on the upper side surface thereof adjacent the free end thereof, said respective cam surfaces being selectively alignable and engageable, whereby said directional output motion of said reverse and direct acting lever is changed and said flapper directional motion is similarly changed with respect to the said nozzle, and relay means connected to said nozzle having a pilot chamber, a main fluid supply chamber, a branch output chamber and an exhaust chamber, said pilot chamber being connected to said pilot chamber through restriction means to the main supply line and said main fluid chamber, whereby the output pressure of said branch output chamber is controlled.

9. In a pneumatic control apparatus comprising a casing for housing in a compact assembly means adaptable for either modulating or two position control or for remote control of said assembly means as selected, means for establishing output pressure variable in response to a condition being measured for the purpose of controlling said condition, said means comprising a superimposed linkage system having an input lever, an output lever and a plurality of intermediate levers so positioned and so arranged as to proportionally transmit movement imparted to the input lever of the linkage system to the output lever of the linkage system, a pilot valve having a flapper and a nozzle, said output lever engaging the lower side of said flapper to move the same to or from the nozzle, said intermediate levers comprising a set point lever and a bifurcated reverse and direct acting lever, a set point lever adjusting means, a manually swingable changeover lever mounted between said intermediate levers, said respective bifurcated ends of said reverse and direct acting lever having cam surfaces on the respective lower side surfaces thereof, said changeover lever having a cooperating cam surface on the upper side surface thereof adjacent the free end thereof, said respective cam surfaces being selectively alignable and engageable, whereby said directional output motion of said reverse and direct acting lever is changed and said flapper directional motion is similarly changed with respect to the said nozzle, and relay means connected to said nozzle having a pilot chamber, a main fluid supply chamber, a branch output chamber and an exhaust chamber, said pilot chamber being connected to said pilot chamber through restriction means to the main supply line and said main fluid supply chamber, whereby the output pressure of said branch output chamber is controlled, feedback means responsive to the output pressure of said branch output chamber, said feedback means comprising an adjustable linkage operatively associated with said output lever for modulating the action of said output lever on said pilot valve flapper, and a throttle control means in said feedback linkage for variably adjusting the operating range of said feedback means, to thereby control the response to said system to the initial setting of said set point lever by said set point lever adjusting means, whereby said desired output pressure is established.

10. In a pneumatic control means as described in claim 9, wherein said feedback throttle control means is manually adjustable to neutral inactive position, to a negative feedback position to oppose a condition variable pressure or to a positive feedback position to oppose the set point adjustment or vice versa according to the position of said changeover lever, if a reverse action is desired.

11. In a pneumatic control apparatus having a nozzle and a flapper pilot valve, a feedback means and a remote control means, an adjustable linkage system having an input link and an output link, said nozzle and flapper pilot valve being movable relative to each other by said linkage system to control output pressure, said apparatus including condition sensing means, said condition sensing means having thrust means at the input link of said linkage system, a set point control means including a rectangular link, said set point link having a plurality of predetermined points of thrust, one of said thrust points being engageable with a thrust point of said input lever, a second of said thrust points being engageable with a lever of said remote control means, and a third intermediate thrust point of said set point lever being connected to a rotatable dial shaft, said set point lever having spaced aligned fourth and fifth thrust points on each side of said dial shaft, and a changeover link swingable on said dial shaft into alignment with either said fourth or said fifth thrust point, a bifurcated lever pivoted at one end above said path of swing of said changeover link, said bifurcated lever having an intermediate thrust point engageable with a corner of said output lever, cam means on the upper side of said changeover lever, and cam means on the underside of said arms of the said bifurcated lever, whereby selective engagement of the changeover lever cam with one of the bifurcated lever cams results in a direct or a reverse action of the output link of the flapper with respect to the said nozzle of said pilot valve, and a throttling range control link connected from said feedback means to a corner of said output lever, said range control link being movable to left or right of a neutral pickoff point of the feedback means as required.

12. In a pneumatic control apparatus having a nozzle and a flapper pilot valve, a feedback means and a remote control means, an adjustable linkage system having an input link and an output link, said nozzle and flapper pilot valve being movable relative to each other by said linkage system to control output pressure, said apparatus including condition sensing means, said condition sensing means having thrust means at the input link of said linkage system, a set point control means including a rectangular link, said set point link having a plurality of predetermined points of thrust, one of said thrust points being engageable with a thrust point of said input lever, a second of said thrust points being engageable with a lever of said remote control means, and a third intermediate thrust point of said set point lever being connected to a rotatable dial shaft, said set point lever having spaced aligned fourth and fifth thrust points on each side of said dial shaft, and a changeover link swingable on said dial shaft into alignment with either said fourth or said fifth thrust point, a bifurcated lever pivoted at one end above said path of swing of said changeover link, said bifurcated lever having an intermediate thrust point engageable with a corner of said output lever, cam means on the upper side of said changeover lever, and cam means on the underside of said arms of the said bifurcated lever, whereby selective engagement of the changeover lever cam with one of the bifurcated lever cams results in a direct or a reverse action of the output link of the flapper with respect to the said nozzle of said pilot valve, a throttling range control link connected from said feedback means to a corner of said output lever, said range control link being movable to left or right of a neutral pickoff point of the feedback means as required, and said remote control means comprising a diaphragm connected to a suitable remotely located pressure sensing line, said diaphragm movement being regulated by a remote control dial and lever system, a lever of said system having a thrust point on an upper surface thereof engageable with a thrust point of said set point lever.

13. In a pneumatic control apparatus as described in claim 11, wherein at least some of said levers of said linkage system are spring biased downwardly with respect to their respective flexure hinge connections, to thereby maintain said respective engaging thrust points of next adjacent levers in constant operative engagement.

14. In a pneumatic control apparatus as described in claim 12, wherein said flapper of the said pilot valve is spring biased toward the said nozzle of the pilot valve to normally maintain said nozzle closed, until said condition responsive means imparts movement thereto through said linkage system.

References Cited by the Examiner

UNITED STATES PATENTS

| | | | |
|---|---|---|---|
| 1,500,260 | 7/24 | Otto et al. | 236—82 |
| 2,125,109 | 7/38 | Harrison et al. | 236—82 |
| 2,258,559 | 10/41 | Shivers | 236—82 X |
| 2,261,827 | 11/41 | Brown et al. | |
| 2,366,246 | 1/45 | Erbguth. | |
| 2,536,198 | 1/51 | Matner et al. | |
| 2,558,316 | 6/51 | Scharpf | 236—86 X |
| 2,675,818 | 4/54 | Gallo et al. | 91—389 X |
| 2,675,826 | 4/54 | Kehoe. | |
| 2,913,185 | 11/59 | Myers | 236—86 |
| 3,002,692 | 10/61 | Williams | 236—82 |

EDWARD J. MICHAEL, *Primary Examiner.*

ALDEN D. STEWART, *Examiner.*